May 19, 1953 E. J. COLLINS 2,639,154

RECORD LIFTING MECHANISM FOR AUTOMATIC PHONOGRAPH RECORD PLAYERS

Filed Jan. 10, 1951

INVENTOR.

Edward J. Collins

BY Clarence E. [illegible]

HIS ATTORNEY.

Patented May 19, 1953 2,639,154

UNITED STATES PATENT OFFICE 2,639,154

RECORD LIFTING MECHANISM FOR AUTOMATIC PHONOGRAPH RECORD PLAYERS

Edward J. Collins, Los Angeles, Calif., assignor to Williams Patent Corporation, Chicago, Ill., a corporation of Illinois Application January 10, 1951, Serial No. 205,247

2 Claims. (Cl. 274—10)

This invention relates to a record lifting mechanism for automatic phonograph record players and has for its principal object the provision of an improved construction of this character which will be highly efficient in use and economical in manufacture.

It is contemplated that my improved record lifting mechanism be used in conjunction with an automatic phonograph player wherein a stack of records are arranged for successive dropping down upon a turntable for successive playing. At the conclusion of the playing of one or more of such records the records are returned in their position upon the record supporting spindle until again released for replay. It is an object of this invention to permit a simplified and improved arrangement for lifting and restacking the records upon the supporting spindle for subsequent release for playing.

Other objects will appear hereinafter.

The invention consists in the novel combination and arrangement of parts to be hereinafter described and claimed.

The invention will be best understood by reference to the accompanying drawings showing the preferred form of construction, and in which.

Figures 1, 2, 3:
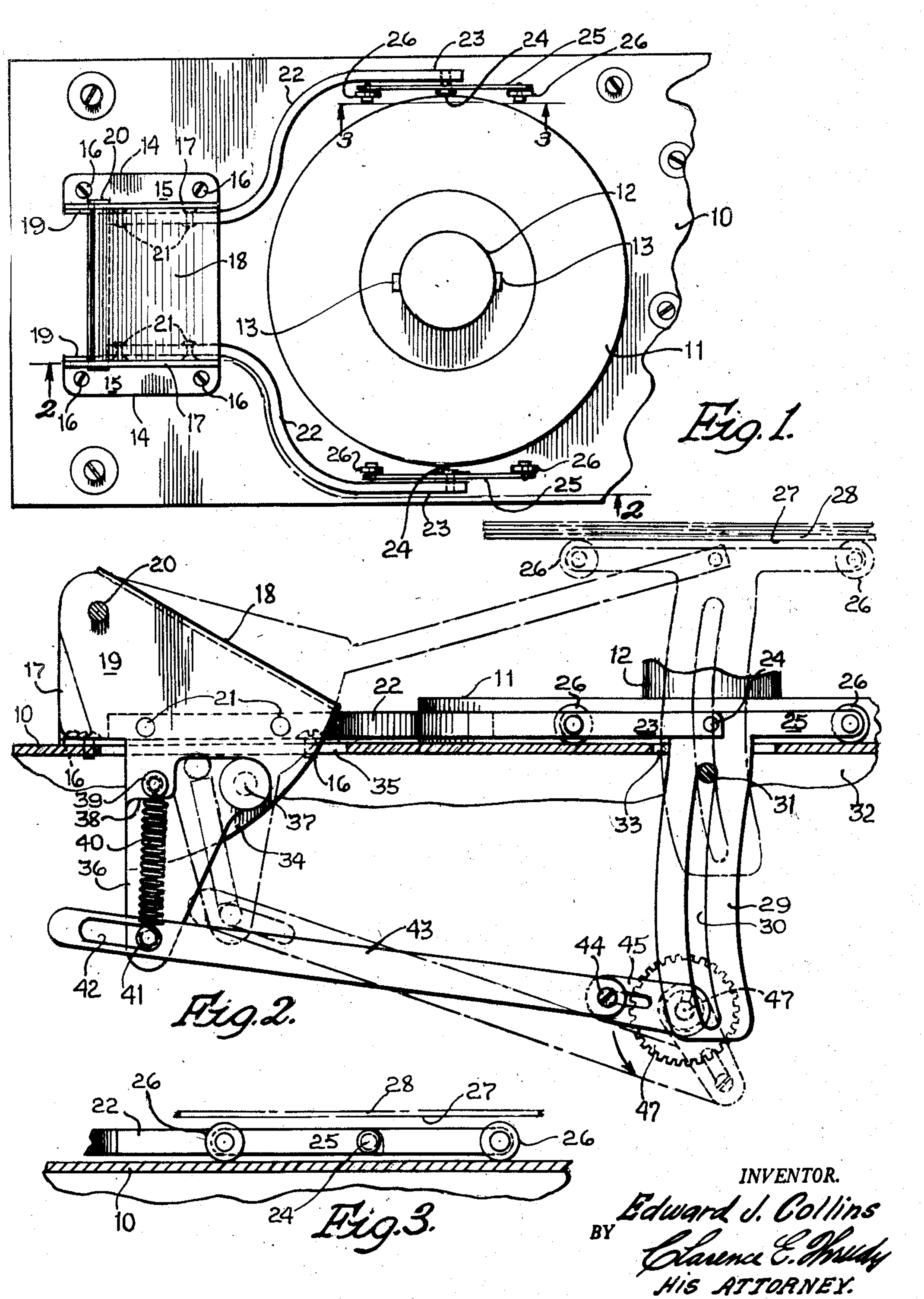
Fig. 1 is a plan view of my improved record lifting mechanism.
Fig. 2 is a sectional detail view taken substantially on line 2—2 of Fig. 1.
Fig. 3 is a fragmentary sectional detail view taken substantially on line 3—3 of Fig. 1.

The conventional automatic phonograph player of which my invention is intended to be a part comprises a mounting plate 10 above which is rotatably supported in any approved and well known manner a record receiving turntable 11. Projecting upwardly from this turntable 11 at the center thereof is a spindle 12 having retractable means 13 of a well known construction for supporting above and in spaced relation to the turntable a stack of records. Such means 13 is diagrammatically illustrated in the drawings and constitutes no part of the present invention.

Fixed to the plate 10 at one edge of the turntable and in spaced relation with respect to each other are brackets 14. Each of these brackets 14 includes a horizontal flange 15 secured to the plate 10 as at 16 and a vertically extending flange 17 formed integral with the flange 15.

Between the vertical flanges 17 is positioned a plate 18 comprising side wings 19 arranged in parallel relation with respect to the flanges 17. This plate 18 is pivotally connected to the flanges 17 by means of a pintle 20.

Secured to the wings 19 as at 21 adjacent their lower edge portions are arms 22 which provide together with the plate 18 a yoke with the end portions 23 of the arms disposed on opposite side edges of the turntable 11.

Pivotally secured to the end portions 23 of the arms 22 as at 24 are elongated record supporting plates 25. The opposite end portions of these plates 25 carry rollers 26 which are adapted to engage the underside 27 of the lowermost record 28 of a stack of records disposed on the turntable. These rollers are preferably formed of such material as will not mar or scratch the surface of the records. Such rollers when not in record supporting position are spaced from the record so as not to interfere with the rotation of the record.

Either or both of the plates 25 may be provided with guiding means. In the present instance I provide a depending extension 29 which is provided with an arcuate elongated slot 30 into which projects a guide shaft or pin 31 carried by the understructure 32 of the plate 10. The extension 29 projects through a slot 33 formed in the plate 10.

One of the wings 19 provides a downwardly extending portion 34 which projects through an elongated slot 35 formed in the plate 10. A connecting link 36 is connected as at 37 to the extension 34 and has cut-out portion providing a shoulder 38 which is adapted to bear against a pin 39 carried by the portion 34 to limit the pivotal movement of the link 36 relative to the extension 34. Pivotal movement of the link 36 away from the pin 39 is yieldably restrained by a spring 40 one end of which is connected to the pin 39 and the opposite end to a pin 41 carried by the lower end portion of the link 36. This pin 41 works in an elongated slot 42 formed in one end portion of a bar 43. The opposite end portion of this bar 43 is connected as at 44 to a driving link 45 fixed to and rotatable with a driven shaft 46. This driven shaft 46 is driven by a gear 47 in turn driven by a suitable motor (not shown).

To lift the records (of which there may be one or more) from the turntable for restacking on the spindle, the gear 47 will rotate the link 45 in the direction of the arrow shown in Fig. 2. Such movement of the link 45 will dispose the pin 41 at the outer end of the slot 42 whereby to effect pivotal movement of the yoke in an upward direction to bring the rollers 26 into contact with the undersurface of the lower most record whereby to lift the record or a stack of records as the case may be, vertically longitudinally with respect to the spindle 12 to a position above the releasing mechanism 13. In moving the records vertically relatively to the spindle 12 it is of course important that the records during this lifting operation do not tilt in either direction with respect to the horizontal plane. To do so would cause the records to rub or bind against the spindle 12. Thus the reason for employing in my arrangement the guide extension 29. The extension 29 during the lifting operation of the records serves to stabilize and maintain the plate 25 in a substantially horizontal plane. This results in moving the records upwardly relative to the spindle 12 without the records rubbing or binding against such spindle.

Should, however, for any reason the movement of the records upwardly of the spindle be prevented, the plates 25 will be prevented from exerting breaking pressure against the records by the spring 40 which will permit, under such condition, pivotal movement of the link 36 about its pivot 37.

It is obvious from the foregoing description that my invention is relatively simple, comprising few parts, thereby resulting in economical manufacture.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A phonograph record lifting mechanism comprising a pair of plates adapted to engage the underside of a record adjacent the peripheral edge thereof, a yoke comprising parallelly extending arms, means pivotally connecting the plates intermediate their end portions to the end portion of said arms, a mounting plate, a pair of spaced brackets connected to said mounting plate, said yoke having an end portion positioned between said brackets, means pivotally connecting said end portion of the yoke to said brackets, means for pivotally moving said yoke relative to said brackets in a direction to bear said plates against the underside of said record, said last-named means including a depending link carried by said yoke, a connecting link, a slot and pin connection between the connecting link and said depending link, a driven shaft, a driving link, and a slot and pin connection between the driving link and the connecting link.

2. A phonograph record lifting mechanism comprising a pair of roller bearing plates adapted to engage the underside of a record adjacent the peripheral edge thereof, a yoke comprising parallelly extending arms, means pivotally connecting the plates intermediate their end portions to the end portion of said arms, a mounting plate, a pair of spaced brackets connected to said mounting plate, said yoke having an end portion positioned between said brackets, means pivotally connecting said end portion of the yoke to said brackets, means for pivotally moving said yoke relative to said brackets in a direction to bear said plates against the underside of said record said last-named means including a depending link carried by said yoke, a connecting link, a slot and pin connection between the connecting link and said depending link, a driven shaft, a driving link, and a slot and pin connection between the driving link and the connecting link.

EDWARD J. COLLINS.

References Cited in the file of this patent

UNITED STATES PATENTS

| Number | Name | Date |
|---|---|---|
| 2,017,898 | Gates | Oct. 22, 1935 |
| 2,178,260 | Kohn | Oct. 31, 1939 |
| 2,546,136 | Ristau et al. | Mar. 20, 1951 |

FOREIGN PATENTS

| Number | Country | Date |
|---|---|---|
| 567,692 | Great Britain | Feb. 27, 1945 |